United States Patent
Choi et al.

(10) Patent No.: US 9,076,047 B2
(45) Date of Patent: Jul. 7, 2015

(54) SYSTEM AND METHOD FOR RECOGNIZING PARKING SPACE LINE MARKINGS FOR VEHICLE

(71) Applicants: Hyundai Motor Company, Seoul (KR); Kia Motors Corporation, Seoul (KR); IUCF-HYU (Industry-University Cooperation Foundation Hanyang University), Seoul (KR)

(72) Inventors: Jae Seob Choi, Gyeonggi-do (KR); Dae Joong Yoon, Gyeonggi-do (KR); Eu Gene Chang, Gyeonggi-do (KR); Ho Gi Jung, Seoul (KR)

(73) Assignees: Hyundai Motor Company, Seoul (KR); Kia Motors Corporation, Seoul (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 209 days.

(21) Appl. No.: 13/715,816

(22) Filed: Dec. 14, 2012

(65) Prior Publication Data

US 2014/0112542 A1 Apr. 24, 2014

(30) Foreign Application Priority Data

Oct. 24, 2012 (KR) .................. 10-2012-0118444

(51) Int. Cl.
*G06K 9/00* (2006.01)
(52) U.S. Cl.
CPC ................. *G06K 9/00812* (2013.01)
(58) Field of Classification Search
CPC ................................. G06K 9/00812
USPC .............................................. 382/104
See application file for complete search history.

(56) References Cited

U.S. PATENT DOCUMENTS

| 2007/0206833 | A1* | 9/2007 | Otsuka et al. ............. 382/103 |
| 2010/0321211 | A1 | 12/2010 | Ko et al. |
| 2011/0210868 | A1* | 9/2011 | Yano et al. ............. 340/932.2 |

FOREIGN PATENT DOCUMENTS

| JP | 4670463 B2 | 4/2011 |
| KR | 10-2009-0088210 A | 8/2009 |
| KR | 10-2010-0060528 A | 6/2010 |
| KR | 10-2010-0096757 A | 9/2010 |

OTHER PUBLICATIONS

Fully-automatic Recognition of Various Parking Slot Markings in Around View Monitor (AVM) Image Sequences. Jae Kyu Suhr and Ho Gi Jung. IEEE Conference. Sep. 16-19, 2012.*
Suhr et al., "Parking Slot Marking Recognition in Around View Monitor Image Sequences", KASE, May 2012, p. 899-p. 902.
Suhr, Jae Kyu et al., "Parking Slot Marking Recognition in Around View Monitor Image Sequences", Hanyang University, English Abstract included, pp. 899-902.

* cited by examiner

*Primary Examiner* — Stephen R Kozoil
*Assistant Examiner* — Delomia Gilliard
(74) *Attorney, Agent, or Firm* — Mintz Levin Cohn Ferris Glovsky and Popeo, P.C.; Peter F. Corless

(57) ABSTRACT

Disclosed herein is a method for recognizing a parking space line marking for a vehicle, including: detecting, by a processor, a plurality of parking spaces from a portion of a parking space line marking in an image; calculating, by the processor, an overlap coefficient representing a degree of overlapping between the detected parking spaces; selecting, by the processor, a parking space having a largest brightness coefficient as a final parking space by determining overlap when the overlap coefficient has a predetermined magnitude and comparing the brightness degrees of the overlapped parking spaces.

19 Claims, 5 Drawing Sheets

SYSTEM AND METHOD FOR RECOGNIZING PARKING SPACE LINE MARKINGS FOR VEHICLE

CROSS-REFERENCE

This application claims under 35 U.S.C. §119(a) the benefit of Korean Patent Application No. 10-2012-0118444 filed Oct. 24, 2012 the entire contents of which are incorporated herein by reference.

BACKGROUND OF THE INVENTION (a) Technical Field

The present invention relates to a system and method for recognizing a parking space line markings for a vehicle capable of automatically extracting and recognizing the parking space line markings from an image of a vehicular imaging device, such as a camera, video camera, vision system, etc.

(b) Background Art

Recently, as a user's interest for automatic parking has increased, research in this technology has begun to play a major role in the business sector and academic sector as well as the research and development sector of the automotive industry. Such an automatic parking system is conventionally made up of three components such as target position designation process, a path planning process, and a path tracking process all of which are executed by a processor that is typically part of a controller installed in the vehicle. Conventional target position designation process may be classified into four categories which include a user-interface based process, infrastructure based process, free-space based process, and parking space line marking based process. Many currently produced products use a user-interface process or the free-space based process.

The user interface based process is the most easily implemented and is useful for correction when automatic recognition has failed, but the user must manually operate the system every time and thus is not a desirable system to most users. The free-space based process uses an ultrasonic sensor to provide a practical solution to the user during parallel parking. However, the system error rate during perpendicular parking is unreasonably high in comparison and as a result, the targeted parking position is often incorrectly set obliquely depending on the height of the directly adjacent vehicles.

A parking space line marking recognition based process, however, has the following advantages as compared with other processes.

1) The parking space line marking recognition based process may minimize the operation degree of a driver which is a very significant problem in a user interface based process. 2) Since the free-space based process sets a parking position depending on the height of a directly adjacent vehicle, a target position may be obliquely set. In the parking space line marking recognition process, a target may be set to be accurately arranged on parking space line marking. 3) Scanning laser radar, short range radar, and stereo camera based processes typically need to include additional sensors, however, the parking space line marking recognition process may use an existing rear imaging device 4) A process using the ultrasonic sensor has a high rate of error during perpendicular parking due to a sensing limit, but the parking space line marking recognition process can be effectively applied during perpendicular parking. 5) A monocular motion stereo based process requires a large amount of computation, but the parking space line marking recognition process may be implemented with a comparatively small amount of computation.

Yet still, the parking space line marking recognition based process may be used only when the parking space line markings are provided. However, most of the time in urban environments (where consumers are most likely to utilize this feature) parking spaces are adequately marked and therefore, this disadvantage is moot. The parking space line marking based process recognizes parking space line markings only an image sensor so long as an infrastructure is not installed when drawing the parking space line marking.

The parking space line marking based process may be classified into a semi-automatic process requiring a user input for information regarding a parking space and a full-automatic process which does not require user input. The semi-automatic process may be more preferably in terms of velocity and recognition rate than the full-automatic process because the user inputs additional information related to a parking space and if an automatic recognition system fails, the semi-automatic process may be highly valuable even as a backup tool.

In some systems, when the user inputs one point in a zone where the user wants to park the vehicle through a touch screen, a method of recognizing the parking space by marking a line-segment with a directional intensity gradient based on the information is provided. However, this process is applied to only one kind of parking space line marking. Accordingly, the initial position of two cross points representing an entrance of the parking zone which the user has requested is input in the touch screen in order to complement it, and a process of recognizing a parking space by template-matching a skeleton in a parking space line marking area acquired through binarization is provided.

The full-automatic process has been developed conventionally in a variety of manners. In some systems, there is provided a process of recognizing the parking space by extracting pixels included in the parking space line marking through a color segmentation process based on a restricted Coulomb energy neural-network by using reasoning that the parking space line marking has a predetermined color. Additionally, after three-dimensional (3D) reconstruction for a vertical edge of the rear of the vehicle is performed using a binocular stereo camera, the parking space line marking is identified by using only the pixels satisfying homography with a ground surface.

Meanwhile, there is provided a process of recognizing the parking space by filtering a Hough space of a bird's-eye view edge image under the assumption that the parking space line marking is configured with two straight lines having a fixed width, which are parallel to each other and a straight line perpendicular thereto. Also there is provided, a process of removing an out lying marking and detecting a straight line through an improved random sample consensus algorithm after continuously calculating a virtual target position based on a vehicle position and a deflection angle just before the vehicle starts to move rearward for parking.

Accordingly, the present invention provides a method for recognizing a parking space line marking capable of being applied to an around view monitor (AVM) moving image in which a plurality of various parking spaces may be displayed. The proposed method uses a method which captures a continuous image to efficiently detect empty parking spaces according to a position or parking spaces expressed at low resolution in an AVM environment.

The description provided above as a related art of the present invention is just for helping in understanding the background of the present invention and should not be construed as being included in the related art known by those skilled in the art.

SUMMARY OF THE INVENTION

The present invention provides a system and method for recognizing parking space line markings for a vehicle capable of being automatically and dynamically applied to various parking space line markings without instructions or input form a user through an imagine device installed in the vehicle.

An exemplary embodiment of the present invention provides a method for recognizing one or more parking spaces for a vehicle which is executed on a processor, including detecting a parking space from a portion of a parking space line marking in an image calculating an overlap coefficient representing a degree of overlapping between the detected parking spaces; and selecting a parking space having a largest brightness coefficient as a final parking space by determining that the overlapping exists when the overlap coefficient has a predetermined magnitude or greater and comparing brightness degrees of the overlapped parking spaces.

The parking space may be an end edge of the parking space line marking comprising three sides.

The processor may calculate an overlap coefficient by the following equation:

$$J(SPACE_i, SPACE_j) = \frac{|SPACE_i \cap SPACE_j|}{|SPACE_i \cup SPACE_j|}$$

Wherein, $|SPACE_i \cup SPACE_j|$ is a sum of lengths of an i-th parking space and a j-th parking space, and $|SPACE_i \cap SPACE_j|$ is a length of the overlapped portion of the i-th parking space and the j-th parking space.

The brightness of the parking spaces may be calculated by a brightness coefficient according to the following equation, respectively, wherein a parking space having a largest brightness coefficient may be selected as the final parking space.

$$NAIV_i = \frac{1}{MAX(I)} \left\{ \frac{1}{N} \sum_{(x,y) \subset SPACE_i} I(x, y) \right\}$$

Herein, $I(x,y)$ is a brightness value of respective points comprising the i-th parking space, N is the number of points comprising an l-th parking space, and MAX(I) is a brightness value of the brightest point in the corresponding image.

The selecting step may further include a reflecting step of calculating, by the processor, a movement degree of the parking spaces in two images having a parallax error and reflecting the previous parking spaces of the previous image to a subsequent image with subsequent parking spaces by using the calculated movement degree. The reflecting step may further include a comparing step of calculating, by the processor, respective overlapping degrees between the reflected previous parking spaces and the subsequent parking spaces.

The comparing step may further include a determining step of determining, by the processor, overlapping of the same parking space or overlapping of different parking spaces according to the respective overlapping degrees between the previous parking spaces and the subsequent parking spaces and determining a final parking space by adding a new parking space or selecting a parking space according to the determined result. Additionally, the processor may add the subsequent parking space as the final parking space by determining the subsequent parking space as the new parking space, when determined that the same parking space is not overlapped. Furthermore, the processor may select a parking space having a largest brightness coefficient of the previous parking space and the subsequent parking space as the final parking space, when determined that the same parking space is overlapped. Moreover, the processor may select a parking space having a largest brightness coefficient than the different parking spaces as the final parking space, when determined that the different parking spaces are overlapped.

In particular, a parking space which is more frequently selected as the final parking space may be selected as the final parking space when determined that the different parking spaces are overlapped with each other, when the parking space is continuously updated with a time interval. Furthermore, in the detecting step, the processor may detect the parking spaces by dividing a plurality of parking space types according to the shape of the parking space line markings, and assign a final shape of the parking space line marking according to the type of parking space of the selected final parking spaces.

BRIEF DESCRIPTION OF THE DRAWINGS

The above and other features, objects and advantages of the present invention will now be described in detail with reference to exemplary embodiments thereof illustrated in the accompanying drawings which are given hereinbelow by way of illustration only, and thus are not limitative of the present invention, and wherein.

Figure 1:
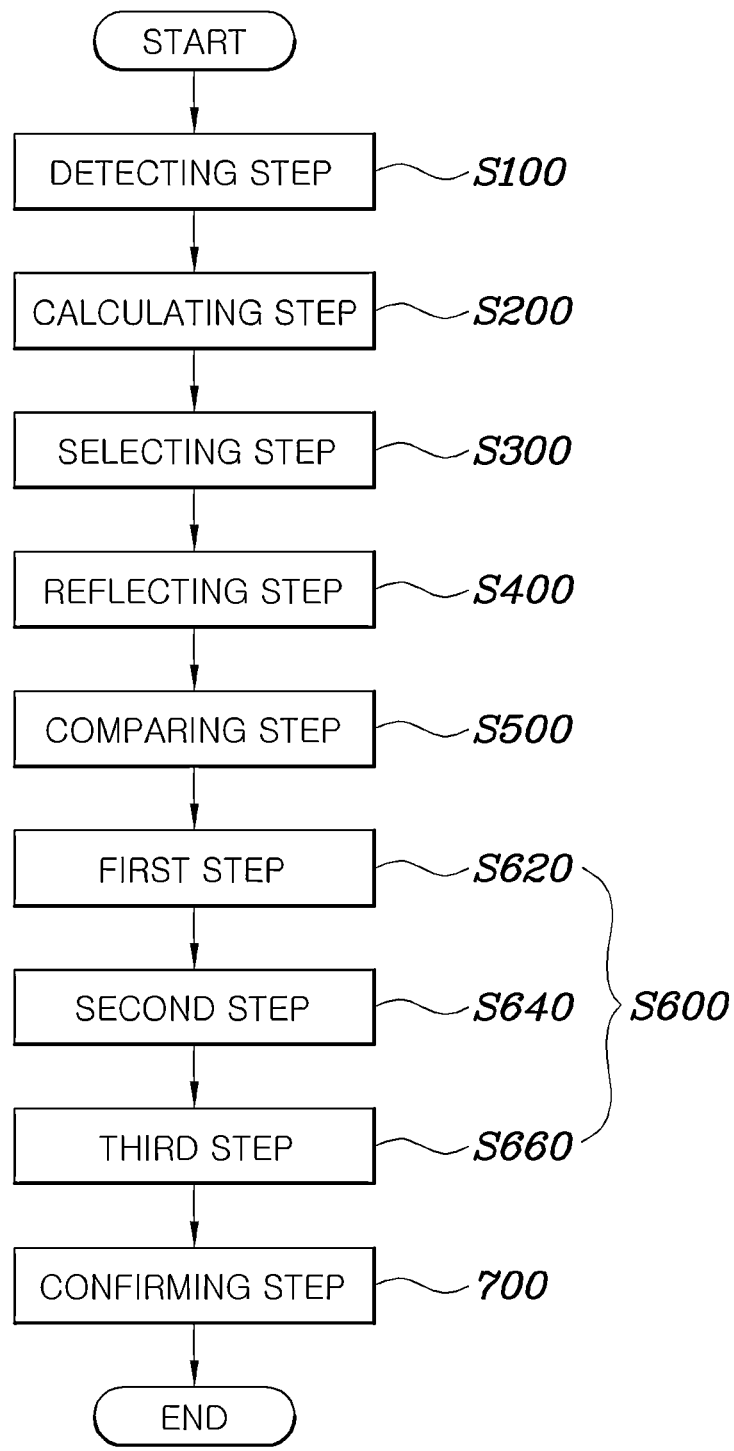
FIG. 1 is an exemplary flowchart illustrating a method for recognizing a parking space line marking for a vehicle according to an exemplary embodiment of the present invention.

It should be understood that the accompanying drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DESCRIPTION OF PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinafter reference will be made in detail to various embodiments of the present invention, examples of which are illustrated in the accompanying drawings and described below.

FIG. 1 is an exemplary flowchart illustrating a method for recognizing a parking space line marking for a vehicle according to an exemplary embodiment of the present invention. The method illustrated in FIG. 1 includes detecting, by a processor, various initial parking spaces. When parking spaces are detected, a position of the parking spaces may be displayed, by the processor on an image. The detected parking spaces in the image are compared with the detected parking spaces in past images to determine actual position of the parking spaces. Further, the parking spaces are clustered based on type and direction thereof to select a cluster from which a final parking space is confirmed.

In particular, SPACEi and SPACEj of the present invention may be end edges of a parking space line marking comprising three sides, and the parking space line marking may be represented by a square such as a rectangle or a parallelogram.

Moreover, the method for recognizing a parking space line marking for a vehicle according to the exemplary embodiment of the present invention may include a detecting step of detecting, by a processor, a parking space from a portion of a parking space line marking in an image (S100); a calculating step of calculating, by the processor, an overlap coefficient representing a degree of overlapping between the detected parking spaces (S200); and a selecting step of selecting, by the processor a parking space having a largest brightness coefficient as a final parking space by determining overlap when the overlap coefficient has a predetermined dimension or greater and comparing the brightness degrees of the overlapped parking spaces (S300).

Specifically, an image photographed with a fisheye lens may be converted into a bird-eye lens type image to generate an around view of the vehicle. In addition, a parking space of each parking space line marking may be detected, by the processor, in the generated image. The detection of the parking space may be performed by various methods, such as using an angular edge captured in the image including the parking space line marking and a crossing point captured in combination with adjacent edges among the captured edges, and then the parking spaces which are the end edges of the parking space line marking may be captured in combination with the captured crossing points.

The calculating step (S200) of calculating, by the processor, an overlap coefficient representing a degree of overlapping between the detected parking spaces may be performed in an order of hierarchy or randomly in which the plurality of detected parking spaces are adjacent to each other.

In particular, the processor may calculate the overlap coefficient using the following equation:

$$J(SPACE_i, SPACE_j) = \frac{|SPACE_i \cap SPACE_j|}{|SPACE_i \cup SPACE_j|} \quad \text{[Equation 1]}$$

Wherein, $|SPACE_i \cup SPACE_j|$ is a sum of lengths of an i-th parking space and a j-th parking space, and $|SPACE_i \cap SPACE_j|$ is a length of the overlapped portion of the i-th parking space and the j-th parking space.

In Equation 1, a method of calculating, by the processor, the overlap coefficient through a ratio of the sum of lengths of the i-th parking space and the j-th parking space and the sum of the length of the overlapped portion is represented. When the overlap coefficient is calculated to be 0, the detected parking spaces are not completely overlapping, and when the overlap coefficient is calculated to be 1, the detected parking spaces are completely overlapping.

Further, the processor may select a parking space having a largest brightness coefficient as a final parking space by determining that overlap when the overlap coefficient has a predetermined dimension or greater and comparing brightness degrees of the overlapped parking space.

Figure 2:
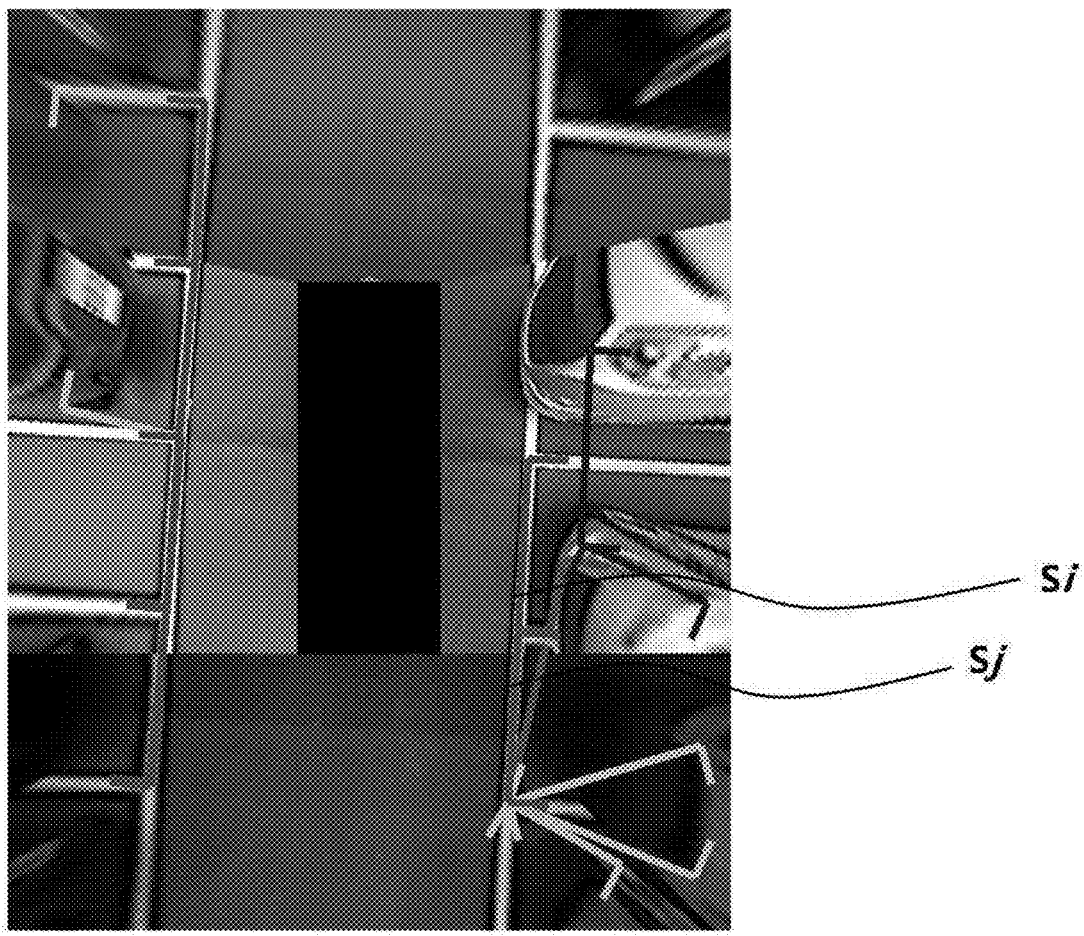
FIG. 2 is an exemplary diagram illustrating a detecting step of the method for recognizing a parking space line marking for a vehicle illustrated in FIG. 1.
Figure 3:
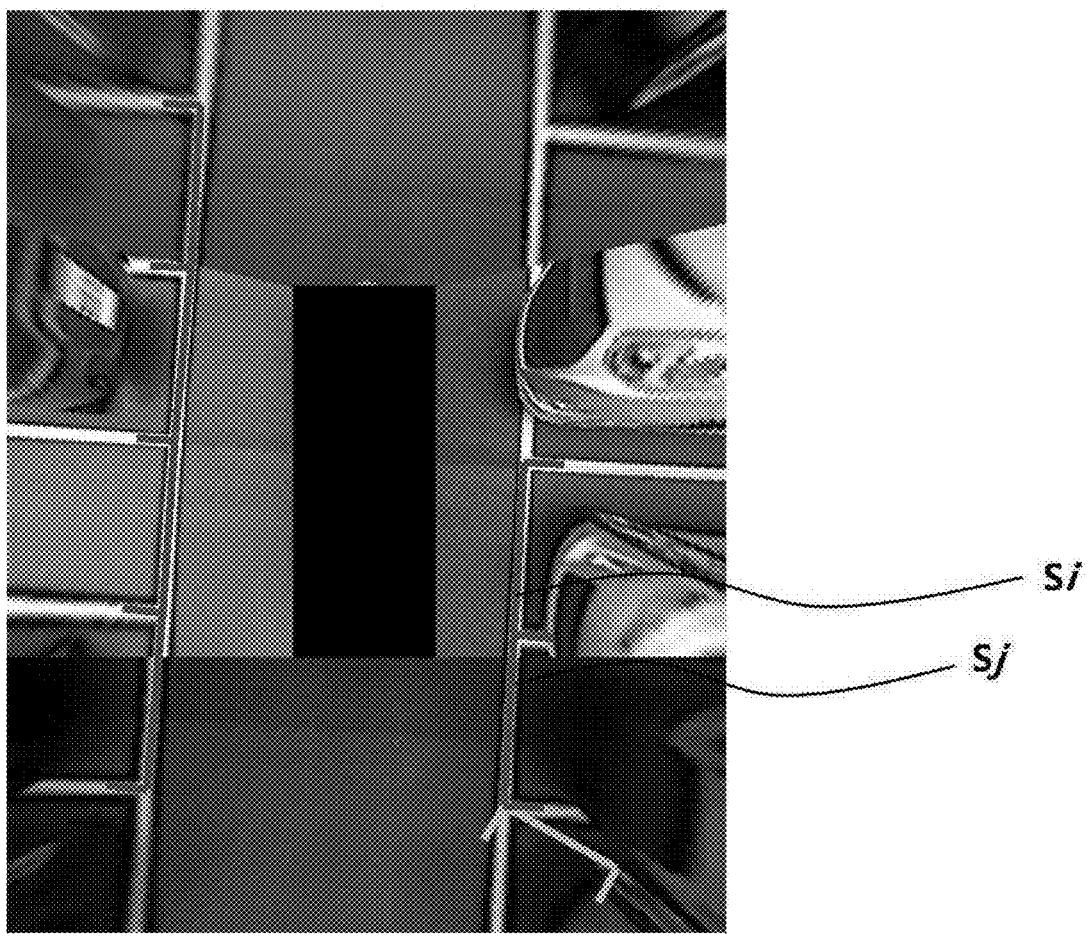
FIG. 3 is an exemplary diagram illustrating a selecting step of the method for recognizing a parking space line marking for a vehicle illustrated in FIG. 1.
Figure 4:
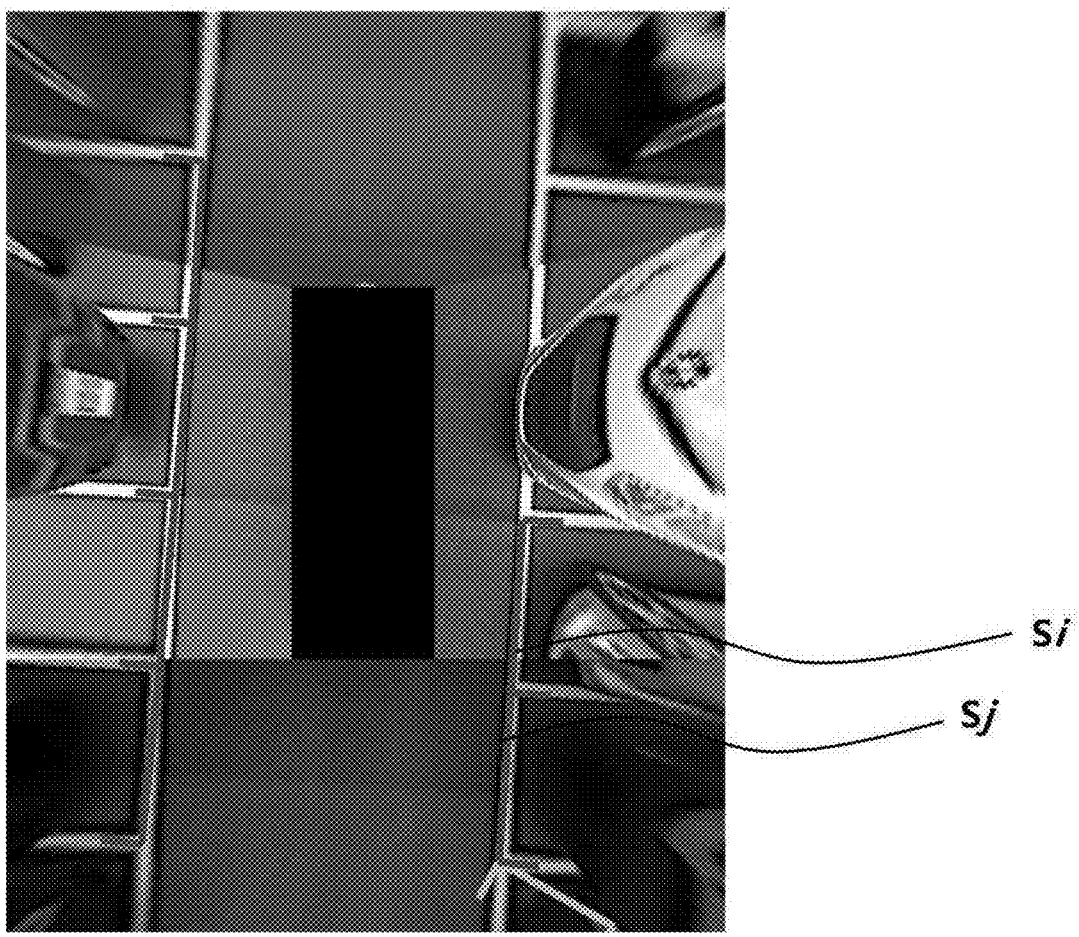
FIG. 4 is an exemplary diagram illustrating a determining step of the method for recognizing a parking space line marking for a vehicle illustrated in FIG. 1.

FIG. 2 is an exemplary diagram illustrating a detecting step of the method for recognizing a parking space line marking for a vehicle illustrated in FIG. 1. FIG. 3 is an exemplary diagram illustrating a selecting step of the method for recognizing a parking space line marking for a vehicle illustrated in FIG. 1. More FIG. 2 and FIG. 3 illustrate steps before and after performing the selecting step.

The brightness of the parking spaces may be calculated by a brightness coefficient according to the following equation, respectively. In the selecting step (S300), a parking space having a largest brightness coefficient may be selected, by the processor, as the final parking space.

$$NAIV_i = \frac{1}{MAX(I)} \left\{ \frac{1}{N} \sum_{(x,y) \subset SPACE_i} I(x, y) \right\} \quad \text{[Equation 2]}$$

Wherein, I(x,y) is a brightness value of respective points of the i-th parking space, N is the number of points of an l-th parking space, and MAX(I) is a brightness value of the brightest point in the corresponding image.

In Equation 2, the brightness coefficient may be calculated by extracting the plurality of points of the parking space, adding the brightness value of each point, dividing the added brightness by the sum of the points, and dividing the divided brightness by the brightness value of the brightest point in the corresponding image. In other words, as an example from FIG. 2, the brightness coefficient may be calculated by extracting 10 points in both the Si and Sj parking spaces, adding the brightness value of each point, dividing the added brightness by 10 (the sum of points), and dividing the divided brightness by the brightness value of the brightest portion in the entire image.

In addition, the parking spaces having large brightness coefficient may be selected among the overlapped parking spaces to capture an image having a shape as illustrated in FIG. 3. In other words, in FIG. 3, only bright parking spaces among the overlapped parking spaces of FIG. 2 may be extracted and selected. Furthermore, is the processor may verify that parking space line markings marked by white lines or yellow lines are relatively accurately selected in a road.

Moreover, the selecting step (S300) may further include a reflecting step (S400) of calculating, by the processor, a movement degree of the parking spaces in two images having a parallax error and reflecting the previous parking spaces of the previous image to a subsequent image together with subsequent parking spaces using the calculated movement degree. In other words, in the around view of the vehicle, since the vehicle continuously moves while the vehicle searches the parking space, the image may change with a time interval. Accordingly, the images may be divided into a plurality of previous images and a plurality of subsequent images, and the images are continuously photographed and analyzed, and as a result, the parking spaces may be more effectively differentiated and determined.

In particular, the movement degree of the parking spaces in two images having a parallax error may be calculated, by the processor, and the previous parking spaces of the previous image may be reflected to a subsequent image together with subsequent parking spaces using the calculated movement degree.

The movement degree of the parking spaces may be determined by various methods of predicting moving distances and directions of all parking spaces of the corresponding image based on the parking space having the largest brightness coefficient or reversely tracing a traveling degree of the vehicle. Thus, the parking spaces in the previous image may reflect in the subsequent image and the previous parking spaces and the detected subsequent parking spaces may coexist in the current image. In other words, when the detection is performed correctly, many of the previous parking spaces and the subsequent parking spaces may overlap. However, a uniform error may occur in this detection process, and hereinafter, a method of correcting the error will be described.

The reflecting step (S400) further includes a comparing step (S500) of calculating, by the processor, respective overlapping degrees between the reflected previous parking spaces and subsequent parking spaces. In the comparing step, similar to the calculating step, the overlap coefficient may be calculated to measure overlap of the parking spaces. In other words, a determining step (S600) includes determining, by the processor, overlap of the same parking space or overlap of different parking spaces according to the respective overlapping degrees between the previous parking spaces and the subsequent parking spaces and determining a final parking space by adding a new parking space or selecting a parking space according to the determined result.

By comparing the previous parking space and the subsequent parking space of Si (which is the same parking space), the processor may determine whether the same parking space is overlapped, and by comparing the previous parking space Si and the subsequent parking space Sj, the processor may determine whether the different parking spaces are overlapped. In particular, when the processor determines that the same parking space is not overlapped, a first step (S620) may include adding, by the processor, the subsequent parking space as the final parking space by determining the subsequent parking space as the new parking space. In addition, when the processor determines that the same parking space is overlapped, a second step (S640) may include selecting, by the processor, a parking space having a largest brightness coefficient of the previous parking space and the subsequent parking space as the final parking space. Further, when the processor determines that the different parking spaces are overlapped, a third step (S660) may includes selecting, by the processor, a parking space having a largest brightness coefficient of the different parking spaces as the final parking space.

In the third step (S660), when the processor determines that the different parking spaces are overlapped, while continuously updated with a time interval, a final parking space may be selected from a parking space which is frequently selected as the final parking space.

Figure 5:
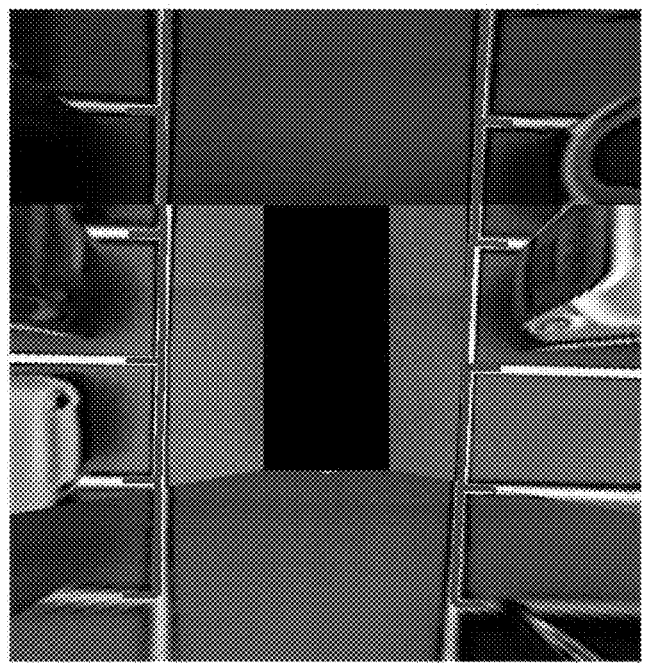
FIGS. 5 and 6 are exemplary diagrams illustrating a confirming step of the method for recognizing a parking space line marking for a vehicle illustrated in FIG. 1.
Figure 6:
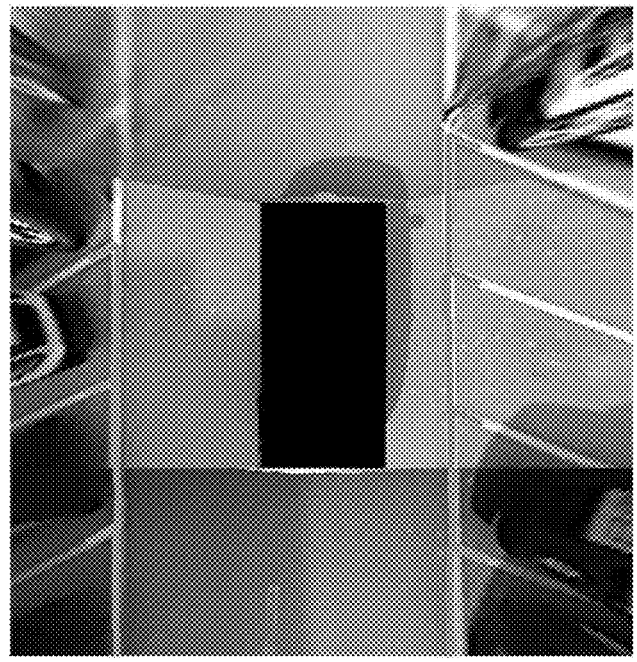

Moreover, in the detecting step (S100), the processor may detect the parking spaces by dividing a plurality of parking space types according to shapes of the parking space line markings, and the determining step (S600) may further include a confirming step (S700) of determining, by the processor, a final shape of the parking space line marking according to a type of parking space selected as the final parking space. In other words, the parking space line markings may be classified into various types such as a rectangle or a parallelogram, and when the final shape of the parking space line marking is determined according to the type of the final parking space, as illustrated in FIGS. 5 and 6, the parking space line marking may be extracted by only the final parking spaces in the final image.

According to the method for recognizing the parking space line marking for the vehicle configured by the structure described above, to efficiently detect empty parking spaces expressed at low resolution in an AVM environment. The proposed method may capture a continuous image to efficiently detect empty parking spaces according to a position or parking spaces expressed at low resolution in an AVM environment. Further, it may be possible to improve recognition performance while improving image quality in a single image and to improve capability of recognizing various types of parking space line markings simultaneously.

The invention has been described in detail with reference to exemplary embodiments thereof. However, it will be appreciated by those skilled in the art that changes, modifications and variations may be made in these embodiments without departing from the principles and spirit of the invention, the scope of which is defined in the appended claims and their equivalents.

What is claimed is:

1. A method for recognizing a parking space line marking for a vehicle, comprising:
   detecting, by a processor, a plurality of parking spaces from a portion of a parking space line marking in an image;
   calculating, by the processor, an overlap coefficient representing a degree of overlap between the detected plurality of parking spaces;
   calculating, by the processor, a brightness coefficient of the detected plurality of parking spaces; and
   selecting, by the processor, one parking space from the detected plurality of parking spaces having a largest brightness coefficient as a final parking space by determining an overlap when the overlap coefficient includes a predetermined dimension and comparing brightness degrees of the overlapped parking spaces.

2. The method of claim 1, wherein each parking space is an end edge of the parking space line marking comprising three sides.

3. The method of claim 1, wherein the processor calculates the overlap coefficient by the following equation:

$$J(SPACE_i, SPACE_j) = \frac{|SPACE_i \cap SPACE_j|}{|SPACE_i \cup SPACE_j|}$$

wherein, $|SPACE_i \cup SPACE_j|$ is a sum of lengths of an i-th parking space and a j-th parking space, and $|SPACE_i \cap SPACE_j|$ is a length of an overlapped portion of the i-th parking space and the j-th parking space.

4. The method of claim 1, wherein the processor calculates the brightness coefficient by the following equation:

$$NAIV_i = \frac{1}{MAX(I)} \left\{ \frac{1}{N} \sum_{(x,y) \subset SPACE_i} I(x, y) \right\}$$

wherein, $I(x,y)$ is a brightness value of respective points of the i-th slot, N is the number of points of an l-th slot, and MAX(I) is a brightness value of the brightest point in the corresponding image.

5. The method of claim 1, further comprising calculating, by the processor, a movement degree of the detected plurality of parking spaces in two images having a parallax error and reflecting a plurality of previous parking spaces of a previous image to a subsequent image with a plurality of subsequent parking spaces using the calculated movement degree.

6. The method of claim 5, further comprising calculating, by the processor, respective overlapping degrees between the reflected plurality of previous parking spaces and the plurality of subsequent parking spaces.

7. The method of claim 6, further comprising determining, by the processor, the overlap according to the respective overlapping degrees between the plurality of previous parking spaces and the plurality of subsequent parking spaces and determining a final parking space by adding a new parking space.

8. The method of claim 6, further comprising determining, by the processor, the overlap according to the respective overlapping degrees between the plurality of previous parking spaces and the plurality of subsequent parking spaces and determining a final parking space by selecting a parking space according to the judged result.

9. The method of claim 6, further comprising adding, by the processor, a subsequent parking space as the final parking space by determining the subsequent parking space as a new parking space, when determined that the same parking space is not overlapped.

10. The method of claim 6, further comprising selecting, by the processor, the parking space having the largest brightness coefficient of a previous parking space and the subsequent parking space as the final parking space, when determined that the same parking space is overlapped.

11. The method of claim 6, further comprising selecting, by the processor, the parking space having the largest brightness coefficient of the different parking spaces as the final parking space, when determined that the different parking spaces are overlapped.

12. The method of claim 11, further comprising selecting, by the processor, a frequently selected parking space as the final parking space when determined, by the processor, that the different parking spaces are overlapped, when the parking space is continuously updated with it time interval.

13. The method of claim 7, wherein the processor detects the plurality of parking spaces by dividing a plurality of parking space types according to a plurality of shapes of the parking space line markings, and determines a final shape of the parking space line marking according to the shape corresponding to the selected final parking space.

14. A controller for recognizing a parking space line marking for a vehicle, comprising:
a memory; and
a processor configured to:
  detect a plurality of parking spaces from a portion of a parking space line marking in an image;
  calculate an overlap coefficient representing a degree of overlap between the detected parking spaces;
  calculate a brightness coefficient of the detected parking spaces; and
  select a parking space from the detected parking spaces having a largest brightness coefficient as a final parking space by determining an overlap when the overlap coefficient includes a predetermined dimension and comparing brightness degrees of the overlapped parking spaces.

15. The controller of claim 14 wherein the processor is further configured to:
  calculate the overlap coefficient using a sum of lengths of an i-th parking space and a j-th parking space and a length of an overlapped portion of the i-th parking space and the j-th parking space;
  calculate the brightness coefficient using a brightness value of a plurality of points of the i-th parking space and an l-th parking space and determine a largest brightness value;
  calculate a movement degree of the detected plurality of parking spaces in two images having a parallax error and reflecting a plurality of previous parking spaces of a previous image to a subsequent image with a plurality of subsequent parking spaces using the calculated movement degree; and
  calculate respective overlapping degrees between the reflected plurality of previous parking spaces and the plurality of subsequent parking spaces.

16. The controller of claim 14, wherein the processor is further configured to detect the plurality of parking spaces by dividing a plurality of parking space types according to a plurality of shapes of the parking space line marking, and determine a final shape of the parking space line marking according to the shape corresponding to the selected final parking space.

17. A non-transitory computer readable medium containing program instructions executed by a processor or controller, the computer readable medium comprising:
  program instructions that detect a plurality of parking spaces from a portion of a parking space line marking in an image;
  program instructions that calculate an overlap coefficient representing a degree of overlap between the detected parking spaces;
  program instructions calculate a brightness coefficient of the detected parking spaces; and
  program instructions select a parking space from the detected parking spaces having a largest brightness coefficient as a final parking space by determining an overlap when the overlap coefficient includes a predetermined dimension and comparing brightness degrees of the overlapped parking spaces.

18. The non-transitory computer readable medium of claim 17, further comprising:

program instructions that calculate the overlap coefficient using a sum of lengths of an i-th parking space and a j-th parking space and a length of an overlapped portion of the i-th parking space and the j-th parking space;

program instructions that calculate the brightness coefficient using a brightness value of a plurality of points of the i-th parking space and an l-th parking space and determine a largest brightness value;

program instructions that calculate a movement degree of the detected plurality of parking spaces in two images having a parallax error and reflecting a plurality of previous parking spaces of a previous image to a subsequent image with a plurality of subsequent parking spaces using the calculated movement degree; and program instructions that calculate respective overlapping degrees between the reflected plurality of previous parking spaces and the plurality of subsequent parking spaces.

19. The non-transitory computer readable medium of claim 17, further comprising program instructions that detect the plurality of parking spaces by dividing a plurality of parking space types according to a plurality of shapes of the parking space line marking, and determine a final shape of the parking space line marking according to the shape corresponding to the selected final parking space.

* * * * *